(12) United States Patent
Astuti et al.

(10) Patent No.: US 11,385,287 B1
(45) Date of Patent: Jul. 12, 2022

(54) METHOD FOR ADAPTIVELY UTILIZING PROGRAMMABLE LOGIC DEVICES

(71) Applicant: XILINX, INC., San Jose, CA (US)

(72) Inventors: Andreas L. Astuti, Singapore (SG); Jian Jun Shi, Singapore (SG); Tho Le La, Hsinchu County (TW)

(73) Assignee: XILINX, INC., San Jose, CA (US)

( * ) Notice: Subject to any disclaimer, the term of this patent is extended or adjusted under 35 U.S.C. 154(b) by 419 days.

(21) Appl. No.: 16/684,460

(22) Filed: Nov. 14, 2019

(51) Int. Cl.
| | |
|---|---|
| *G01R 31/3185* | (2006.01) |
| *G06F 30/34* | (2020.01) |
| *G06F 30/343* | (2020.01) |
| *G06F 30/347* | (2020.01) |
| *G06F 30/31* | (2020.01) |
| *G06K 9/62* | (2022.01) |

(52) U.S. Cl.
CPC ......... *G01R 31/318516* (2013.01); *G01R 31/318519* (2013.01); *G06F 30/31* (2020.01); *G06F 30/34* (2020.01); *G06F 30/343* (2020.01); *G06F 30/347* (2020.01); *G06K 9/6267* (2013.01)

(58) Field of Classification Search
CPC .... G01R 31/318516; G01R 31/318519; G06F 30/34; G06F 30/31; G06F 30/343; G06F 30/347
USPC .......... 714/725, 736, 737, 742; 716/117
See application file for complete search history.

(56) References Cited

U.S. PATENT DOCUMENTS

| | | | | |
|---|---|---|---|---|
| 5,655,069 | A * | 8/1997 | Ogawara | G06F 11/2236 714/E11.166 |
| 6,237,124 | B1 * | 5/2001 | Plants | G01R 31/318519 714/763 |
| 6,772,381 | B1 * | 8/2004 | Somchit | G01R 31/318516 714/736 |
| 6,772,387 | B1 * | 8/2004 | Plants | G01R 31/318519 714/763 |
| 7,047,465 | B1 * | 5/2006 | Trimberger | G01R 31/2894 714/725 |
| 7,251,804 | B1 * | 7/2007 | Trimberger | G06F 30/34 716/112 |
| 7,284,229 | B1 * | 10/2007 | Trimberger | G06F 30/34 716/117 |
| 7,409,610 | B1 * | 8/2008 | Drimer | G01R 31/3187 365/201 |

(Continued)

OTHER PUBLICATIONS

Hanchek et al., Node-Covering Based Defect and Fault Tolerance Methods for Increased Yield in FPGAs, 1996, IEEE. pp. 225-229. (Year: 1996).*

*Primary Examiner* — John J Tabone, Jr.
(74) *Attorney, Agent, or Firm* — Patterson + Sheridan, LLP (57) ABSTRACT

Examples described herein provide a method for evaluating a programmable logic device (PLD) for compatibility with user designs. The method includes using a processor-based system: obtaining an indication of one or more failure bits of configuration memory of a programmable logic device (PLD); determining whether each of the one or more failure bits corresponds to a configuration memory bit to be used by a first PLD user design; if any of the one or more failure bits corresponds to a configuration memory bit to be used by the first PLD user design, classifying the PLD as unusable for the first PLD user design; and if none of the one or more failure bits corresponds to a configuration memory bit to be used by the first PLD user design, classifying the PLD as usable for the first PLD user design.

20 Claims, 5 Drawing Sheets

(56) References Cited

U.S. PATENT DOCUMENTS

| | | | |
|---|---|---|---|
| 7,412,635 B1* | 8/2008 | Trimberger | G01R 31/318516 326/23 |
| 7,424,655 B1* | 9/2008 | Trimberger | G01R 31/318516 703/23 |
| 7,619,438 B1* | 11/2009 | Trimberger | H03K 19/17764 365/189.12 |
| 7,764,081 B1* | 7/2010 | Tuan | H03K 19/17764 326/14 |
| 7,793,251 B2* | 9/2010 | Goodnow | H03K 19/17796 716/128 |
| 7,810,059 B1 | 10/2010 | Trimberger | |
| 7,853,916 B1 | 12/2010 | Trimberger et al. | |
| 8,117,497 B1* | 2/2012 | Lesea | G06F 11/10 714/34 |
| 8,522,091 B1* | 8/2013 | White | G06F 11/073 714/725 |
| 8,713,409 B1* | 4/2014 | Tseng | G11C 11/4125 714/768 |
| 9,372,956 B1 | 6/2016 | Fan et al. | |
| 9,450,609 B1* | 9/2016 | Schmit | G06F 11/1012 |
| 10,503,584 B1* | 12/2019 | Merl | G06F 11/1008 |
| 2004/0216081 A1* | 10/2004 | Wells | G06F 30/34 713/1 |
| 2009/0031194 A1* | 1/2009 | Bellipaddy | G06F 11/1052 714/764 |
| 2012/0131417 A1* | 5/2012 | Rodriguez | G06F 11/106 714/763 |
| 2016/0299872 A1* | 10/2016 | Vaidyanathan | G06F 12/0646 |
| 2018/0285192 A1* | 10/2018 | Merl | G06F 11/0736 |

\* cited by examiner

METHOD FOR ADAPTIVELY UTILIZING PROGRAMMABLE LOGIC DEVICES

TECHNICAL FIELD

Examples of the present disclosure generally relate to evaluating programmable logic devices for compatibility with one or more user designs.

BACKGROUND

Programmable logic devices (PLD) may be implemented to perform specified functions. PLDs can have any number of components, including memory blocks (e.g., static random access memory) to provide hardware programmability. PLDs are typically fabricated and packaged after the PLDs pass testing during the manufacturing process. However, some PLDs that fail testing are rejected and discarded.

SUMMARY

Examples of the present disclosure generally relate to evaluating programmable logic devices for compatibility with one or more user designs, in an effort to reduce and reuse otherwise rejected programmable logic devices.

One example of the present disclosure is a method for evaluating a programmable logic device. The method generally includes: obtaining an indication of one or more failure bits of configuration memory of a programmable logic device (PLD); determining whether each of the one or more failure bits corresponds to a configuration memory bit to be used by a first PLD user design; if any of the one or more failure bits corresponds to a configuration memory bit to be used by the first PLD user design, classifying the PLD as unusable for the first PLD user design; and if none of the one or more failure bits corresponds to a configuration memory bit to be used by a first PLD user design, classifying the PLD as usable for the first PLD user design.

Another example of the present disclosure is a method for evaluating programmable logic devices. The method generally includes using a processor-based system: receiving a programmable logic device (PLD) user design comprising an indication of configuration memory bits to be used by the PLD user design; obtaining failure bits of configuration memory of a plurality of PLDs; identifying a PLD of the plurality of PLDs to which the PLD user design can be deployed, wherein none of the failure bits of the identified PLD corresponds to any of the configuration memory bits to be used by the PLD user design; and deploying the PLD user design to the identified PLD of the plurality of PLDs.

Aspects of the present disclosure also provide apparatus, methods, processing systems, and computer readable mediums for performing the operations described above.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

After being manufactured, programmable logic devices (PLDs) can be binned based on their functionalities, and the binning of the PLDs can result in several categories for the PLDs, including for functional PLDs or unusable PLDs, also referred to as rejects. PLDs can be binned as rejects or nonfunctional for multiple reasons. One reason can be that a bit of configuration memory does not function as intended. Even though any PLD may be considered a reject due to a non-functional configuration memory bit, the PLD can be re-evaluated and can be compatible and usable with a number of user designs.

Examples herein describe a method for evaluating PLDs (e.g., field programmable gate arrays (FPGAs)) for compatible user designs based on functionality of the PLD. To do so, the functionality of the PLD is assessed for compatibility with one or more PLD user designs, and classified for compatibility accordingly. In an example involving evaluating a PLD for a compatible user design using a processor-based system, an indication of a failure bit(s) of configuration memory of the PLD is obtained. If the failure bit(s) corresponds to any configuration memory bit to be used by a PLD user design, then the processor-based system generates a disposition for the PLD corresponding to the PLD user design, such as that the PLD is not usable or compatible for the PLD user design. If no failure bit(s) correspond to the configuration memory bits to be used by a PLD user design, then the PLD is usable to be configured with the PLD user design and is considered compatible with the PLD user design.

A method also contemplates adaptively deploying various user designs to identified ones of multiple PLDs, which can include partially functional PLDs and/or fully functional PLDs. A fully functional PLD is a PLD with configuration memory having no failure bits, while a partially functional PLD is a PLD with configuration memory having at least one failure bit. The method involves, using a processor-based system, receiving a PLD user design comprising an indication of which configuration memory bits of a PLD are and/or are not to be used by the corresponding PLD user design. The failure bits of configuration memory of a plurality of PLDs are obtained, and a PLD is identified from the plurality of PLDs where the failure bits of the identified PLD do not overlap or do not correspond with any configuration memory bits that are to be used by the PLD user design. Upon identifying the PLD from the plurality of PLDs, the PLD user design is deployed to the identified PLD, which involves loading the PLD user design to the identified PLD.

Figure 1:
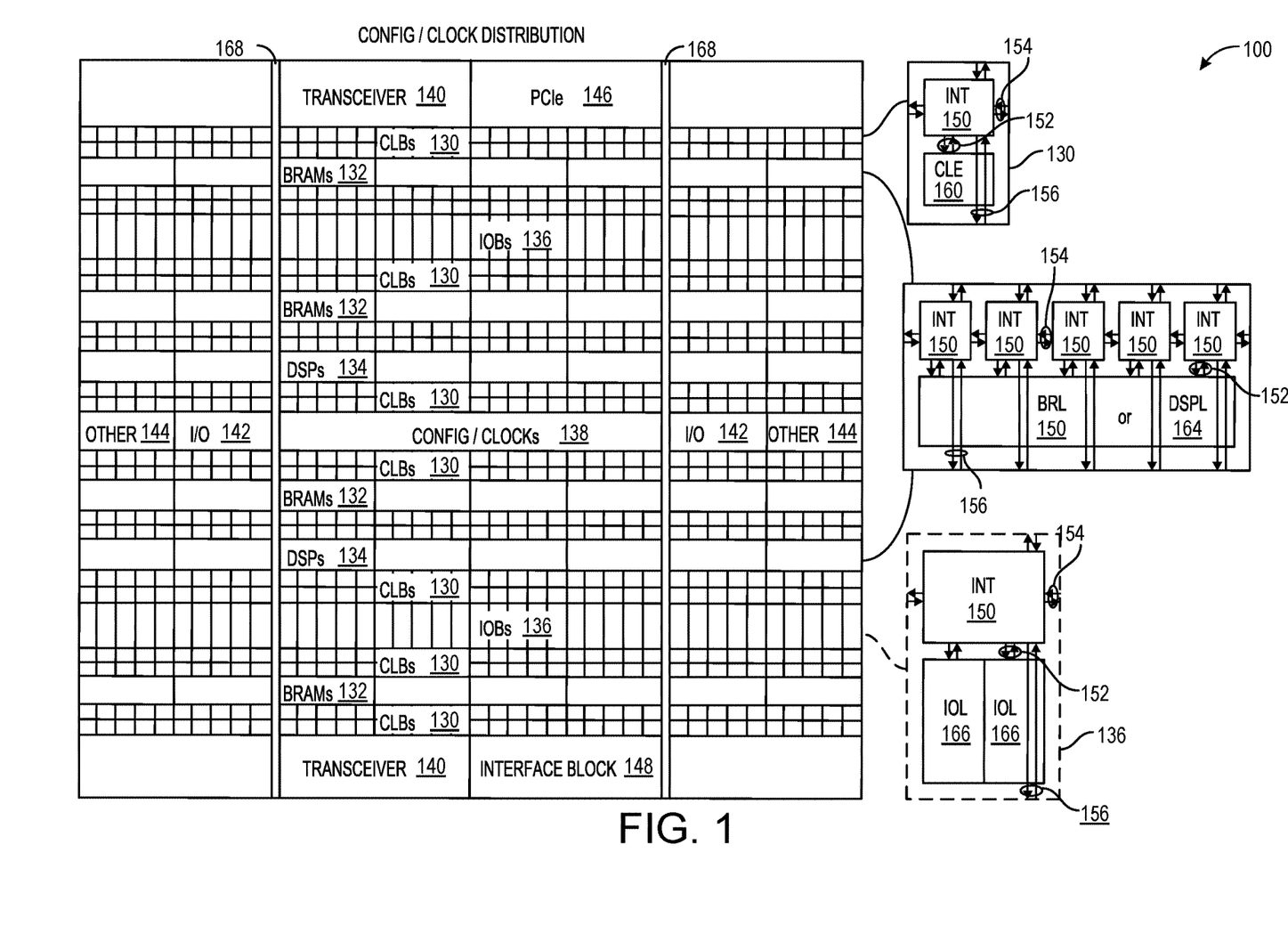
FIG. 1 illustrates a field programmable gate array (FPGA) that can be evaluated for compatibility with user designs, according to one example.

FIG. 1 illustrates an FPGA 100 implementation of a PLD that can be evaluated for compatible user designs. Each logic element of an FPGA (as described below) can include bits of configuration memory, and any of the bits of the configuration memory can be defective or unusable. For example, a single configuration memory bit can fail to work as intended (herein referred to as a failure memory bit), and thus, the entire FPGA previously would be considered defective, a reject, and unusable because of the single configuration memory bit not working as intended. Previously, because the FPGA would be considered a reject, the FPGA would have been discarded and not used with any user design. However, even if the FPGA has a failure memory bit and the FPGA would have previously been considered nonfunctional, the FPGA can still be used with some user designs because the FPGA can still function using configuration memory bits that work as intended. Compatible user designs can be loaded and run on partially functional FPGAs that have some failure configuration memory bits and some functional configuration memory bits, because compatible user designs do not need to use the failure configuration memory bits and can work on the functional configuration memory bits. Accordingly, to prevent these partially functional FPGAs from being discarded, methods disclosed herein can evaluate the FPGA for a user design that can function using the functional configuration memory bits when loaded on the FPGA.

In some examples, FPGA 100 includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 1. Each programmable interconnect element 43 can also include connections to interconnect segments 49 of adjacent programmable interconnect(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 1) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In some examples, the programmable tiles of the FPGA 100 (as described above) each include bits of configuration memory. The FPGA 100 can further include a configuration subsystem (e.g., a CFRAME subsystem) for configuring or programming the programmable tiles. In some examples, a CFRAME subsystem can receive configuration data for the programmable tiles of the FPGA 100 and can function as the configuration controller for configuring or programming the programmable tiles of the FPGA 100.

After the FPGA 100 is manufactured, the bits of the configuration memory of the programmable tiles are tested. In some examples, testing the bits of the configuration memory comprises performing readback testing on the configuration memory. In such examples, readback testing involves writing to the configuration memory, reading the configuration memory, and comparing the values read from the configuration memory with expected values based on the values written to the configuration memory. If any value read from a particular bit of the configuration memory of the FPGA does not match the expected results, then the particular configuration memory bit is considered a failure bit. As mentioned, if the FPGA has any failure bit, the FPGA would have previously been considered unusable. However, these previously unusable FPGAs can be partially functional, and to keep these FPGAs from being discarded, the methods disclosed herein can evaluate the FPGA for a user design that can function using the functional configuration memory bits when loaded on the FPGA. Accordingly, techniques described herein provide for a technical solution to evaluate an FPGA (or more broadly, any PLD) to identify when a partially functional FPGA is usable for user designs utilizing configuration memory bits that are functional.

The above described FPGA is provided herein as an example of a PLD to provide context to various methods described herein. Other types of PLDs may be implemented in different methods.

Figure 2:
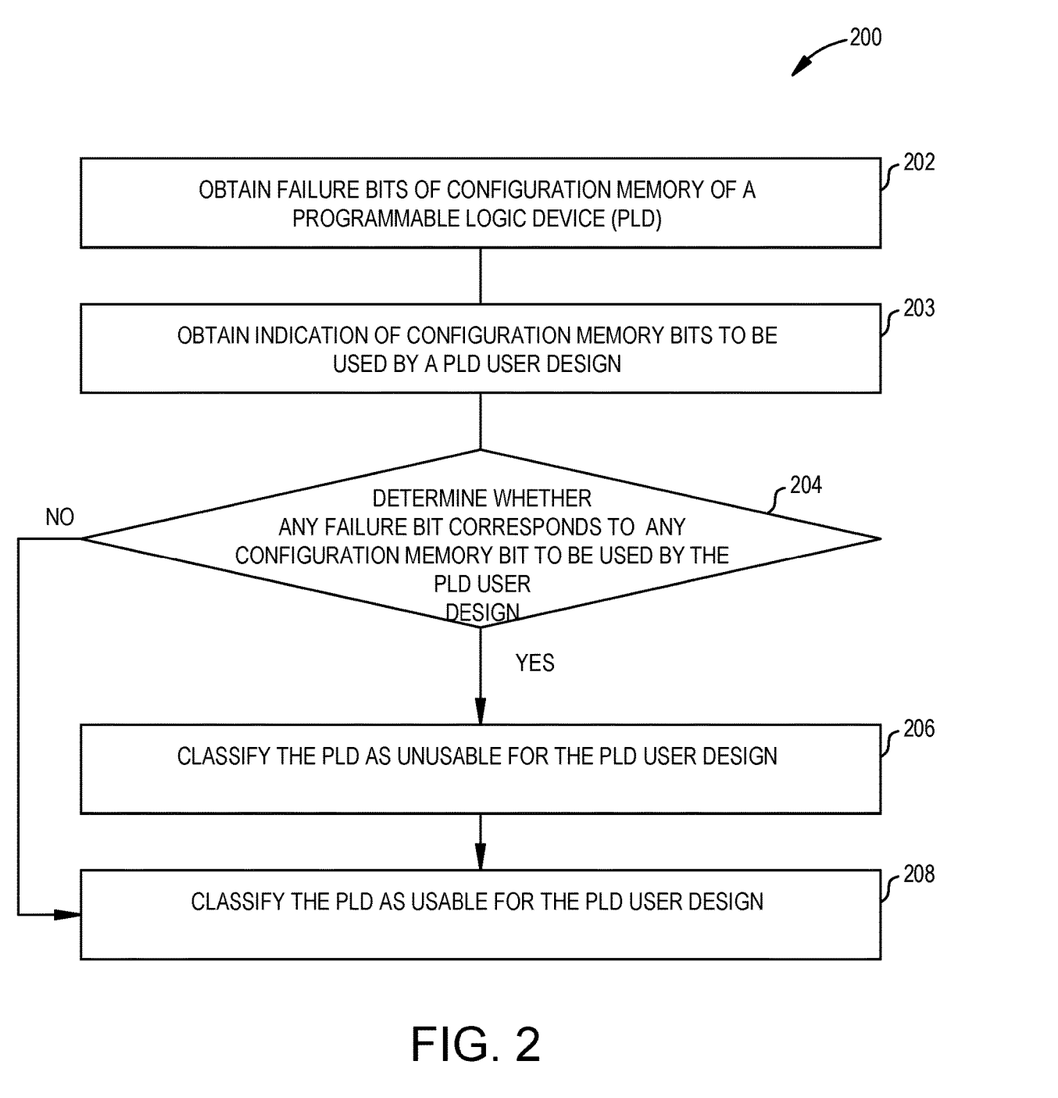
FIG. 2 is a flowchart of a technique to evaluate programmable logic devices for compatibility with user designs, according to one example.

FIG. 2 is a flowchart of evaluating PLDs for compatible user designs, according to one example. Operations 200 illustrate how an evaluation tool of a PLD evaluation system (e.g., evaluation system 300 of FIG. 3) can evaluate a PLD for compatible user designs.

Operations 200 begin, at block 202, with the evaluation tool obtaining the failure bits of configuration memory of a PLD. The PLD can be any type of programmable logic device, such as the FPGA of FIG. 1, and has configuration memory (e.g., static random access memory (SRAM)) and other components. The PLD can be a fully functional PLD or a partially functional PLD, as designated (e.g., marked) after testing during manufacturing.

In some examples, obtaining the failure bits of the PLD comprises accessing data or a file (e.g., stored in a database) that is generated based on performing readback testing on the PLD. Readback testing can involve writing to the configuration memory and comparing values read from the configuration memory with expected values (e.g., values that were written to the configuration memory). If any value read from a bit of the configuration memory of the PLD does not match the corresponding expected result, then the bit of the configuration memory is considered a failure bit. The failure bits can be recorded as data in a file stored in a database that is subsequently accessed to obtain the failure bits. The database can store any number of files of failure bits for different PLDs.

At block 203, the evaluation tool obtains an indication (e.g., a file) of configuration memory bits to be used by a PLD user design. The PLD user design can be stored in a PLD user design database, which can include respective files for multiple PLD user designs. In some examples, the indication of the configuration memory bits to be used by a PLD user design can be a bitstream. In other examples, the indication of the configuration memory bits to be used by a PLD user design can be merely a file listing or indicating addresses of bits of configuration memory that are to be used. In such a case, the PLD user design may not be revealed or misappropriated by the indication of the configuration memory bits to be used by the PLD user design. For example, the indication of the configuration memory bits to be used by the PLD user design can be provided to a third party without the third party being able to obtain the PLD user design from the indication of the configuration memory bits to be used by the PLD user design.

At block 204, the evaluation tool compares the configuration memory bits to be used by the PLD user design with the failure bits of the PLD. If any of the failure bits of the PLD correspond to any configuration memory bits to be used by the PLD user design, at block 206, the evaluation tool classifies the PLD as unusable for the PLD user design. If none of the failure bits of the PLD corresponds to any configuration memory bits to be used by the PLD user design, then, at block 208, the evaluation tool classifies the PLD as usable for the PLD user design. In one example, after being classified as usable for the PLD user design, the PLD can be loaded with a bitstream corresponding to the PLD user design, and the PLD can implement the PLD user design.

In some examples, the operations 200 can be repeated for any number of PLD user designs and for any number of PLDs. For example, a PLD can be compared against each PLD user design and may be classified (e.g., with multiple classifications) accordingly. Further, a PLD user design may be compared against each PLD, and each PLD can be classified accordingly. In such examples, the evaluation tool can access multiple PLD user designs from the PLD user design database and can access failure bits of multiple PLDs from the failure bits database.

As an example, assume a manufacturer manufactures a number of PLDs. The manufacturer can perform readback testing on each PLD, and can generate failure bits of configuration memory for each PLD. The failure bits can be stored in a database. One or more users can create a number of PLD user designs. The user(s) can create respective files indicating which configuration memory bits are to be used by the PLD user designs. The user(s) can provide the files to manufacturer, and since the files do not contain the PLD user designs or bitstreams of the PLD user designs, the manufacturer may be unable to determine or obtain the PLD user designs. The manufacturer can compare the failure bits of the manufactured PLDs to the configuration memory bits to be used by the PLD user designs to classify which PLDs are usable and unusable for various ones of the PLD user designs. The manufacturer can provide PLDs classified as usable for given PLD user designs to the user(s), and a user can implement a PLD user design on a PLD that is classified as usable for that PLD user design.

Figure 3:
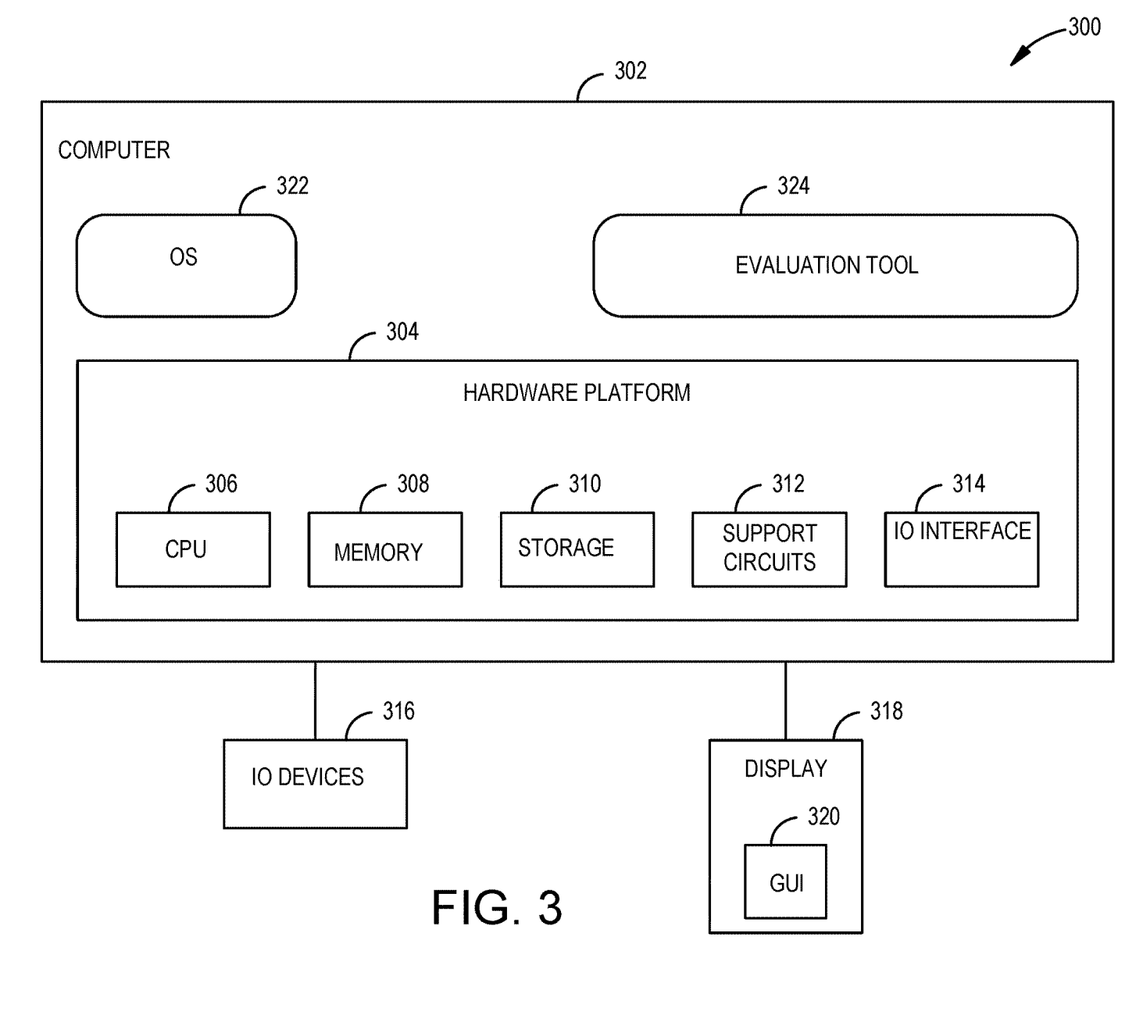
FIG. 3 is a block diagram depicting an example of an evaluation system that can be used to evaluate programmable logic devices for compatibility with user designs, according to one example.

FIG. 3 is a block diagram depicting an example of an evaluation system 300 that can be used to evaluate programmable logic devices for compatibility with PLD user designs, in accordance with some examples. The evaluation system 300 (e.g., a processor-based system) can be used to determine whether a PLD is compatible with a PLD user design. The evaluation system 300 includes a computer 302 coupled to input/output (IO) devices 316 and a display 318. The computer 302 includes a hardware platform 304 that can include components of a computing device, such as a central processing unit (CPU) 306, system memory 308, storage 310, various support circuits 312, and an IO interface 314. The CPU 306 can include one or more microprocessors. The CPU 306 is configured to execute program instruction code that performs one or more operations described herein. The program instruction code can be stored in system memory 308, storage 310, or any other memory in the hardware platform 304 (e.g., cache memory). The system memory 308 includes one or more non-transitory storage mediums that store information and can include, for example, random access memory (RAM), read-only memory (ROM), or a combination thereof. The storage 310 includes one or more local non-transitory storage mediums, such as hard disks, flash memory modules, solid state disks, optical disks, and the like. The storage 310 can also include interface(s) configured for communication with one or more network data storage systems. The support circuits 312 can include cache, power supplies, clock circuits, data registers, IO interfaces, and the like. The IO interface 314 includes interfaces to/from the computer 302. The IO interface 314 can be coupled to the IO devices 316, which can include a keyboard, mouse, and the like. The IO interface 314 can also be coupled to the display 318, which can present a graphical user interface (GUI) 320 to a user.

The computer 302 further includes a software platform comprising an operating system (OS) 322 and an evaluation tool 324. The OS 322 and the evaluation tool 324 include program instruction code that is executed by the CPU 306, which program instruction code can be stored in system memory 308, storage 310, or any other memory. The OS 322 can include any known operating system, such as Linux®, Microsoft Windows®, Mac OS®, and the like. The evaluation tool 324 is an application that executes within the OS 322, which provides an interface to the hardware platform 304. Some operations of the evaluation tool 324 include various ones of the operations 200 of FIG. 2, and/or operations 500 of FIG. 5.

Figure 4:
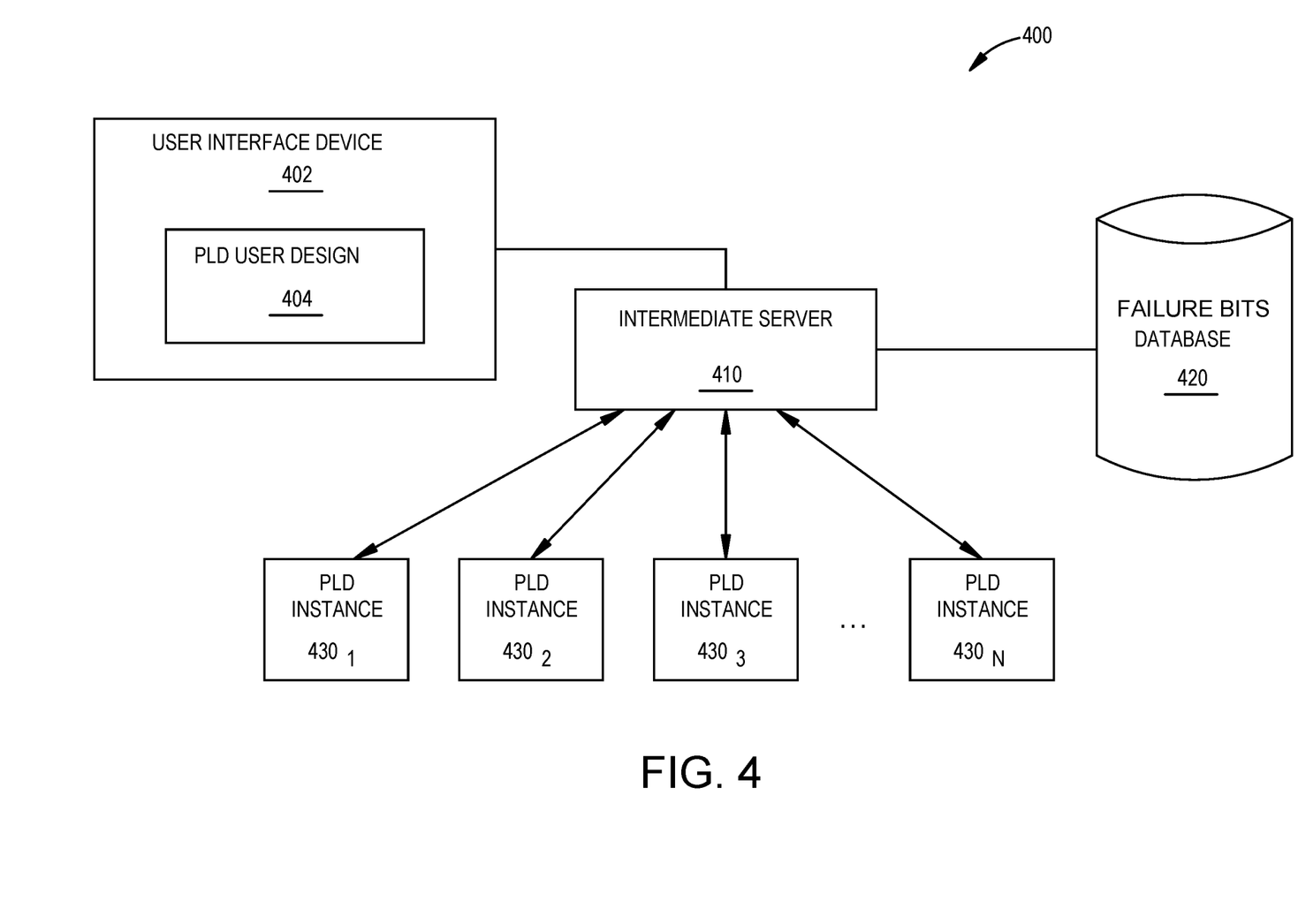
FIG. 4 is a block diagram depicting an example system evaluating programmable logic devices for compatibility with user designs, according to one example.

FIG. 4 is a block diagram depicting a system 400 for deploying a PLD user design to one or more of multiple PLDs for implementation, according to one example. The system 400 comprises a user interface device 402, an intermediate server 410, a failure bits database 420, and PLD instances 430. In some examples, the PLD instances 430 can be in a data center in which any number of user designs can be implemented, and each PLD instance 430 can be compatible with at least one of the user designs.

The user interface device 402 can be a computing system, similar to the evaluation system 300 of FIG. 3, and is configured to interact with the user to generate a PLD user design to implement on a PLD instance 430. In one example, the user interface device 402 can generate a configuration bitstream based on the PLD user design to transmit to the intermediate server 410. In other examples, the user interface device 402 transmits the PLD user design 404 to the intermediate server 410 for deployment to the multiple PLD instances 430. In some examples, the PLD user design 404 comprises an indication of the configuration memory bits to be used by the PLD user design 404.

The intermediate server 410 receives a PLD user design 404 and/or the indication of the configuration memory bits to be used by the PLD user design 404 from the user interface device 402 and compares the configuration memory bits to be used by of the PLD user design 404 against failure bits corresponding to a PLD instance 430. In one example, the intermediate server 410 receives the PLD user design 404 and/or the indication from the user interface device 402 over a computer communications network (e.g., the Internet) (not illustrated). The intermediate server 410 also receives information from the failure bits database 420, including the failure bits of a PLD instance 430, for comparing the configuration memory bits to be used by the PLD user design 404 against the failure bits of a PLD instance 430. In one example, the intermediate server 410 can obtain the failure bits of configuration memory of each PLD instance 430 of the system 400. For example, the failure bits of configuration memory of the PLD instances 430 can be obtained at manufacturing (e.g., by readback testing), where a failure bits file is generated and is transferred with the corresponding PLD. The transferred failure bits file can be stored in the failure bits database 420. In some examples, when the intermediate server 410 obtains the failure bits of configuration memory of each PLD instance 430, the intermediate server 410 performs readback testing of each PLD instance 430, and the readback testing identifies which bits of configuration memory of the PLD instance 430 are failure bits. The intermediate server 410 can obtain the failure bits of configuration memory of PLD instance 430 and transmit the failure bits to the failure bits database 420 for storage and future comparison against user design bits of a PLD user design 404.

In some examples, the intermediate server 410 determines whether the PLD user design 404 can be deployed to any of the PLD instances 430. In such examples, the intermediate server 410 determines whether the configuration memory bits to be used by the PLD user design 404 correspond to any of failure bits of the PLD instances 430. Accordingly, the intermediate server 410 receives failure bits of one or more of the PLD instances 430, and compares the configuration memory bits to be used by the PLD user design 404 and the failure bits of the one or more PLD instances 430. If any failure bits correspond to the configuration memory bits to be used by the PLD user design 404, then the PLD instance 430 cannot be used for the PLD user design 404, and the intermediate server 410 transmits a request for failure bits of another PLD instance 430 to the failure bits database 420 and repeats the process of receiving and comparing failure bits of the other PLD instance 430. If none of the failure bits correspond to the configuration memory bits to be used by the PLD user design 404, then the PLD instance 430 can be used for and is compatible with the PLD user design 404. If the PLD instance 430 can be used for the PLD user design 404, then the intermediate server 410 configures the identified PLD instance 430 with the PLD user design 404. In one example, the intermediate server 410 loads the PLD instance 430 with the PLD user design 404 (using a configuration bitstream).

The system 400 has any number of PLD instances $430_1$-$430_N$ (referred generally as a PLD instance 430). Each PLD instance 430 can be a fully functional PLD or a partially functional PLD, and the failure bits of configuration memory of each PLD instance 430 is stored in the failure bits database 420. In some examples, a PLD instance 430 can be a FPGA or any other type of programmable logic device. In some examples, the PLD instances 430 can include PLDs that do not have any failure bits. For example, the PLD instances 430 can include PLDs that are fully functional PLDs and PLDs that are partially functional. In some examples, multiple PLD instances 430 can be used with a compatible user design, and the compatible PLD user design 404 can be loaded onto multiple PLD instances depending on the failure bits of the PLD instances 430 and the configuration memory bits to be used by the PLD user design 404.

The failure bits database 420 receives failure bits of each PLD instance 430. As mentioned, the intermediate server 410 can obtains the failure bits of each PLD instance for the comparison. The intermediate server 410 can also sends the failure bits to the failure bits database 420 for storage (e.g., as a database manager). The failure bits database 420 can use any data structure to store the failure bits of the PLD instances 330.

Figure 5:
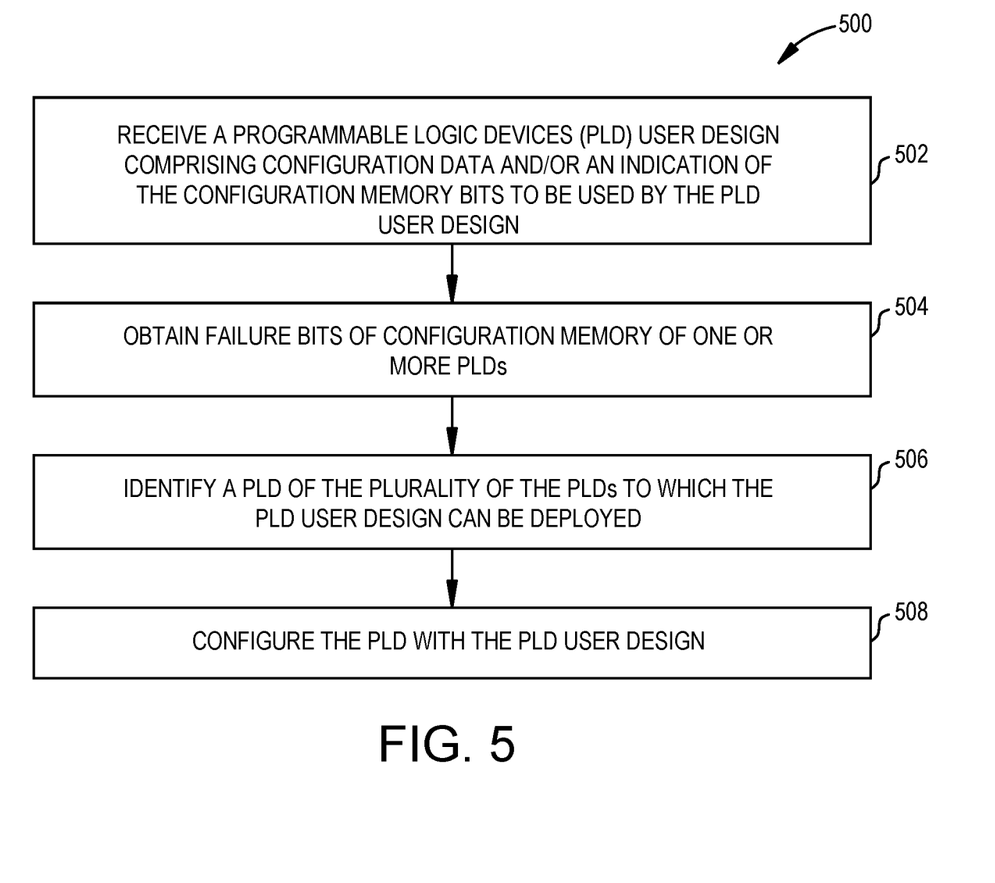
FIG. 5 is a flowchart of a technique to evaluate programmable logic devices for compatibility with user designs, according to one example.

FIG. 5 is a flowchart of a technique to evaluate programmable logic devices for compatibility with a user design using a system 400, according to one example. Operations 500 can be performed by the intermediate server 410 of the system 400.

Operations 500 begins at, at block 502, with the intermediate server 410 receiving a PLD user design 404 comprising configuration data and/or an indication of the configuration memory bits to be used by the PLD user design 404.

As illustrated in FIG. 4, a user can generate a PLD user design 404 using the user interface device 402, and the intermediate server 410 receives the PLD user design 404 from the user interface device 402. The PLD user design 404 can include, for example, configuration data (e.g., a bitstream) and an indication of the configuration memory bits to be used by the PLD user design 404.

At block 504, the intermediate server 410 obtains failure bits of configuration memory of one or more of PLD instances 430. At block 506, the intermediate server 410 identifies a PLD instance 430 of the plurality of PLD instances 430 to which the PLD user design 404 can be deployed. In one example, if none of the failure bits of a given PLD instance 430 corresponds to any of the configuration memory bits to be used by the PLD user design 404, the intermediate server 410 can identify that PLD instance 430 as compatible for the PLD user design 404. In one example, the intermediate server 410 analyzes the failure bits of one or more of the PLDs in order to determine a PLD from the plurality of PLD instances 430. The failure bits of the plurality of PLDs can be stored in a failure bits database 420.

At block 508, upon identifying the PLD of the plurality of PLD instances 430, the intermediate server 410 deploys the PLD user design to the PLD instance of plurality of PLD instances 430. Once the intermediate server 410 has determined a PLD instance with failure bits that do not correspond to configuration memory bits to be used by the PLD user design 404, the intermediate server 410 can configure the PLD instance according to the PLD user design. In one example, configuring the PLD instance 430 according to the PLD user design 404 involves loading a bitstream to the PLD.

In some examples, the intermediate server 410 can receive more than one PLD user design 404 for deployment to a PLD of the plurality of the PLDs, and can deploy more than one PLD user design 404 to the plurality of PLDs. In one example, the plurality of PLDs includes a fully functional PLD, and the intermediate server 410 deploys the PLD user design 404 to the fully functional PLD.

The various examples described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples may be implemented as useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium (e.g., a non-transitory storage medium) include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

While the foregoing is directed to specific examples, other and further examples may be devised without departing from the basic scope thereof, and the scope thereof is determined by the claims that follow.

What is claimed is:

1. A method comprising:
using a processor-based system:
   obtaining an indication of one or more failure bits of configuration memory of a programmable logic device (PLD);
   determining whether each of the one or more failure bits corresponds to a configuration memory bit to be used by a first PLD user design;
   if any of the one or more failure bits corresponds to a configuration memory bit to be used by the first PLD user design, classifying the PLD as unusable for the first PLD user design; and
   if none of the one or more failure bits corresponds to a configuration memory bit to be used by a first PLD user design, classifying the PLD as usable for the first PLD user design.

2. The method of claim 1, further comprising:
using the processor-based system:
   determining whether each of the one or more failure bits corresponds to a configuration memory bit to be used by a second PLD user design;
   if any of the one or more failure bits corresponds to a configuration memory bit to be used by the second PLD user design, classifying the PLD as unusable the second PLD user design; and
   if none of the one or more failure bits corresponds to a configuration memory bit to be used by a second PLD user design, classifying the PLD as usable for the second PLD user design.

3. The method of claim 1 further comprising, when the PLD is classified as usable for the first PLD user design, loading a configuration bitstream corresponding to the first PLD user design to the PLD.

4. The method of claim 1, wherein obtaining the indication of the one or more failure bits of configuration memory of the PLD includes performing readback testing on the PLD, wherein the readback testing identifies the one or more failure bits of the configuration memory of the PLD.

5. The method of claim 1, further comprising: determining whether any of the one or more failure bits correspond to a configuration memory bit to be used by any PLD user design stored in a user design database.

6. The method of claim 1, wherein the configuration memory comprises static random access memory.

7. A method, comprising:
using a processor-based system:
receiving a programmable logic device (PLD) user design comprising an indication of configuration memory bits to be used by the PLD user design;
obtaining failure bits of configuration memory of a plurality of PLDs;
identifying a PLD of the plurality of PLDs to which the PLD user design can be deployed, wherein none of the failure bits of the identified PLD corresponds to any of the configuration memory bits to be used by the PLD user design; and
deploying the PLD user design to the identified PLD of the plurality of PLDs.

8. The method of claim 7, wherein obtaining the failure bits of the configuration memory of the plurality of PLDs includes performing readback testing on the PLDs, wherein the readback testing identifies the failure bits of the configuration memory of the PLDs.

9. The method of claim 7, further comprising: storing the failure bits of configuration memory into a failure bits database.

10. The method of claim 7, wherein the configuration memory comprises static random access memory.

11. The method of claim 7, wherein deploying the PLD user design to the identified PLD of the plurality of PLDs comprises configuring the identified PLD with a configuration bitstream corresponding to the PLD user design.

12. The method of claim 7, wherein at least one PLD of the plurality of PLDs is a fully functional PLD.

13. The method of claim 7, wherein at least one PLD of the plurality of PLDs is a partially functional PLD.

14. A non-transitory computer-readable medium storing instructions, which executed by a processor, cause the processor to perform operations, the operations comprising:
receiving a programmable logic device (PLD) user design comprising an indication of configuration memory bits to be used by the PLD user design;
obtaining failure bits of configuration memory of a plurality of PLDs;
identifying a PLD of the plurality of PLDs to which the PLD user design can be deployed, wherein none of the failure bits of the identified PLD corresponds any of the configuration memory bits to be used by the PLD user design; and
deploying the PLD user design to the identified PLD of the plurality of PLDs.

15. The non-transitory computer-readable medium of claim 14, wherein obtaining the failure bits of the configuration memory of the plurality of PLDs includes performing readback testing on the PLDs, wherein the readback testing identifies the failure bits of the configuration memory of the PLDs.

16. The non-transitory computer-readable medium of claim 14, wherein the operations further comprise: storing the failure bits of configuration memory into a failure bits database.

17. The non-transitory computer-readable medium of claim 14, wherein the configuration memory comprises static random access memory.

18. The non-transitory computer-readable medium of claim 14, wherein deploying the PLD user design to the identified PLD of the plurality of PLDs comprises configuring the identified PLD with a configuration bitstream corresponding to the PLD user design.

19. The non-transitory computer-readable medium of claim 14, wherein at least one PLD of the plurality of PLDs is a fully functional PLD.

20. The non-transitory computer-readable medium of claim 14, wherein at least one PLD of the plurality of PLDs is a partially functional PLD.

* * * * *